United States Patent [19]

Bonko

[11] Patent Number: 5,464,050
[45] Date of Patent: Nov. 7, 1995

[54] NON-DIRECTIONAL PNEUMATIC TIRE FOR USE ON AGRICULTURAL TRACTORS AND OTHER LIKE VEHICLES

[75] Inventor: Mark L. Bonko, Uniontown, Ohio

[73] Assignee: The Goodyear Tire & Rubber Company, Akron, Ohio

[21] Appl. No.: 262,673

[22] Filed: Jun. 20, 1994

[51] Int. Cl.⁶ ................................................ B60C 11/11
[52] U.S. Cl. ................................. 152/209 B; D12/147
[58] Field of Search .......................... 152/209 R, 209 B, 152/209 D; D12/147

[56] References Cited

U.S. PATENT DOCUMENTS

| | | | |
|---|---|---|---|
| D. 157,953 | 4/1950 | Hawkinson | D12/147 |
| D. 168,675 | 1/1953 | Custer | D12/149 |
| D. 169,835 | 6/1953 | Billingsley | D12/146 |
| D. 170,710 | 10/1953 | Nellen | D12/146 |
| D. 172,996 | 9/1954 | Smith | D12/147 |
| D. 174,386 | 4/1955 | Hawkinson | D12/136 |
| D. 175,214 | 7/1955 | French | D12/140 |
| D. 178,166 | 7/1956 | Benson | D12/140 |
| D. 335,847 | 5/1993 | Kuwahara | D12/151 |
| D. 342,927 | 1/1994 | Thomas | D12/136 |
| 1,142,470 | 6/1915 | Wheelock | 152/304 |
| 1,185,481 | 5/1916 | Clark | 152/290 |
| 1,197,030 | 9/1916 | Jenkins | 152/304 |
| 1,214,566 | 2/1917 | Mallaby | 152/304 |
| 1,423,519 | 7/1922 | Farkas | 301/44.3 |
| 1,460,247 | 6/1923 | Johnson | 152/209 R |
| 1,658,623 | 2/1928 | Wittkopp | 152/300 |
| 1,867,518 | 7/1932 | Maclean et al. | 280/156 |
| 2,113,527 | 4/1938 | Hale | 152/209 D |
| 2,150,107 | 3/1939 | Shields | 301/53.5 |
| 2,203,617 | 6/1940 | Hale | 152/209 B |
| 2,241,227 | 5/1941 | Wait et al. | 152/209 B |
| 2,271,337 | 1/1942 | Hale et al. | 152/209 NT |
| 2,324,996 | 7/1943 | Coben | 152/209 B |
| 3,841,372 | 10/1974 | Boileau | 152/209 R |
| 3,844,326 | 10/1974 | Verdier | 152/209 B |
| 4,667,718 | 5/1987 | Fontaine | 152/209 R |
| 5,046,541 | 9/1991 | Bonko | 152/209 B |

FOREIGN PATENT DOCUMENTS 2210002  6/1989  United Kingdom ............ B60C 11/03

OTHER PUBLICATIONS

Ageless Iron Trading Cards (see poster attached).

*Primary Examiner*—Michael W. Ball
*Assistant Examiner*—Francis J. Lorin
*Attorney, Agent, or Firm*—David L. King

[57] ABSTRACT

A pneumatic agricultural tire 20 having a unique non-directional tread 32 is disclosed. The tread 32 has a plurality of lugs 50. The lugs 50 are arranged in sets 60 of at least three preferably four lugs having substantially parallel lug centerlines 63, the set 60 being repeated circumferentially around the tread 32. The set 60 extends along a line 62 through the lug centers 61 in a substantially straight line from tread edge to tread edge. The centerline 63 of each lug 50A, 50B, 50C, 50D are substantially parallel and form an acute angle with the equatorial plane of about 45°.

8 Claims, 9 Drawing Sheets

NON-DIRECTIONAL PNEUMATIC TIRE FOR USE ON AGRICULTURAL TRACTORS AND OTHER LIKE VEHICLES

BACKGROUND OF THE INVENTION

This invention relates to a non-directional pneumatic agricultural tire for use on farm tractors and similar agricultural type vehicles. Tractor tires must have good vibration characteristics on and off the road while maintaining good traction or drawbar characteristics. Such tires must also provide for the removal of soil, mud, etc., during in-field use.

In the past, agricultural vehicles were horse drawn. With the introduction of motorized tractors in the early 1900's the farm wheels were made of steel with traction cleats extending across the steel wheel. E. J. Farkas in 1922 patented a detachable tread for tractor wheels. U.S. Pat. No. 1,423,519 describes a rubber tread member that could be added to the steel cleat thus making it possible to cross a road without destroying the paved surface. These historical vehicles were greatly underpowered for the task of farming. Accordingly, the wheels were generally designed to be somewhat, if not entirely, non-directional with cleats inclined or normal to the direction of travel. The non-directional characteristic was helpful when the tractor became stuck. In such cases, horses would be hooked to the rear of the vehicle and the tractor with the assistance of added horsepower could reverse itself out of the muck.

As tractor motors improved, the tires became directional in design. The tractor's primary function required forward pulling power and tires were accordingly designed to enhance this feature.

In 1942, James E. Hale, a farm tire engineer, developed a pneumatic tire for heavy muck. U.S. Pat. No. 2,271,337 describes an attempt to design a non-directional tire having a central rib. Hale's tire, although noted to be non-directional, was also noted to be self-cleaning in only one direction on each side of the tire. This mud packing characteristic was a common problem of all tractor tires but is particularly troublesome for non-directional tractor tires.

As the agricultural tires advanced in design and construction, the tire art field has become one of almost exclusively directional tread patterns.

The related art field of earthmover tires, although being somewhat directional in tread design, employs more tread patterns that are non-directional. Earthmover tires generally have a more closed tread pattern exhibiting net-to-gross ratios above 40%, whereas agricultural tires are more open having net-to-gross ratios of less than 40%, typically less than 30%. A 1974 U.S. Pat. No. 3,844,326 depicts a lugged tire for heavy construction equipment employing a nondirectional type pattern.

Similarly, a U.S. design patent 178,166 displays a multilug non-directional pattern. These type tread patterns commonly employ an increased net-to-gross ratio in the center of the tread and lugs having a lug width at the radially outer surface greater than two-thirds of the radial height of the lug. Designed for durability under heavily loaded off-road conditions, earthmover tires can accept some levels of mud packing in the center of the tread. Recently a new type farm tractor has been developed that will require substantially equivalent forward and reverse traction under load. These multipurpose tractors will accordingly require a non-directional tread pattern.

SUMMARY OF THE INVENTION

A non-directional pneumatic agricultural tire 20 is described. The tire 20 has a maximum section width, an axis of rotation, an equatorial plane perpendicular to the axis, the equatorial plane being located at the midpoint of the maximum section width. The tire 20 preferably has a nominal rim diameter of 24.0 inches or greater. The tire 20 has a carcass 21 reinforced with rubber coated cord and a rubber tread 32 disposed radially outwardly of the carcass 21. The tread 32 has a first and a second tread edge 33A,33B and a plurality of tread lugs 50 disposed between the tread edges. The lugs have a length of at least 10% of the section width. The tread, when normally loaded and inflated, has a net-to-gross ratio of the less than 40%, preferably about 30% or less.

The tread 32 has a set 60 including at least three, preferably four lugs 50. The lugs 50 have substantially parallel lug centerlines 63. The set 60 is repeated a plurality of times circumferentially about the tread 32. The set 60 extends along a line 62 through the lug centers 61 in a substantially straight line across the tread 32 from the first tread edge 33A to the second tread edge 33B. The centerlines 63 of each of the lugs 50 are parallel and forms an acute angle $\theta$ with the equatorial plane of about 45°.

DEFINITIONS

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design rim width" is the specific commercially available rim width assigned to each tire size and typically is between 75% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross ratio" means the ratio of the surface area of the normally loaded and normally inflated tire tread rubber that makes contact with a hard flat surface, divided by the area of the tread, including noncontacting portions such as grooves as measured around the entire circumference of the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference.

"Trailing" refers to a portion or part of the tread that contacts the ground last, with respect to a series of such parts or portions during rotation of the tire in the direction of travel.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified Inflation pressure but not subjected to any load.

"Tread width" means the arc length of the tread surface in the axial direction, that is, in a plane passing through the axis of rotation of the tire.

"Unit tread pressure" means the radial load borne per unit area (square centimeter or square inch) of the tread surface when that area is in the footprint of the normally inflated and normally loaded tire.

DESCRIPTION OF THE DRAWINGS

The following is a brief description of the drawings in which like parts bear like reference numerals and in which.

DETAILED DESCRIPTION OF THE INVENTION

Figure 5:
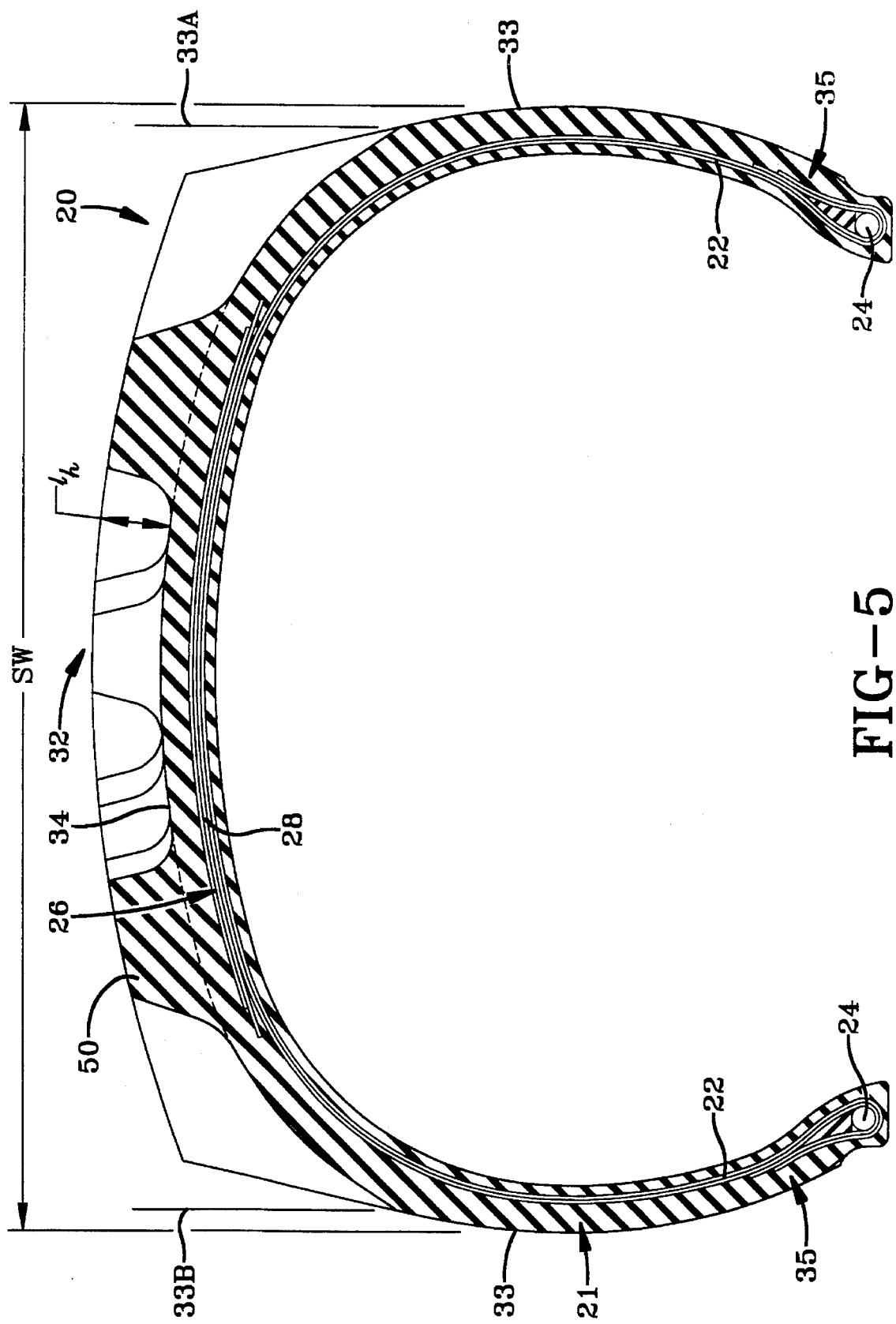
FIG. 5 is a cross-sectional view of the preferred tire taken along lines 5—5 of FIG. 2.

Now referring to FIG. 5, a tire is shown in cross-section view generally as reference numeral 20. The pneumatic tire has a carcass 21 having one or more carcass plies 22 extending circumferentially about the axis of rotation of the tire 20. The carcass plies are anchored around a pair of substantially inextensible annular beads 24. A belt reinforcing member 26 comprising one or more belt plies 28 are disposed radially outwardly from the carcass plies. The belt plies provide reinforcement for the crown region of the tire. A circumferentially extending tread portion 32 is located radially outwardly of the belt reinforcing structure 26.

A sidewall portion 33 extends radially inwardly from each axial or lateral tread edge 33A,33B of the tread portion to an annular bead portion 35 having the beads 24 located therein.

The carcass plies 22 preferably have textile or synthetic cords reinforcing the plies. The cords are preferably oriented radially. Most preferably, the cords are made of polyester or nylon material. Typically, the tire may have two, three or four plies, each construction increasing in load carry capability as a function of the number of plies.

The belt reinforcement member 26 preferably includes at least two belts reinforced by synthetic cords of rayon or aramid.

Now referring to FIGS. 1–5, a tire 20 according to the present invention is illustrated. The tire 20 according to the present invention has a unique tread 32. The tread 32 has a first tread edge 33A and a second tread edge 33B. Disposed between the tread edges 33A,33B is an inner tread 34 and a plurality of lugs 50 extending radially outwardly from the inner tread 34.

Figure 1:
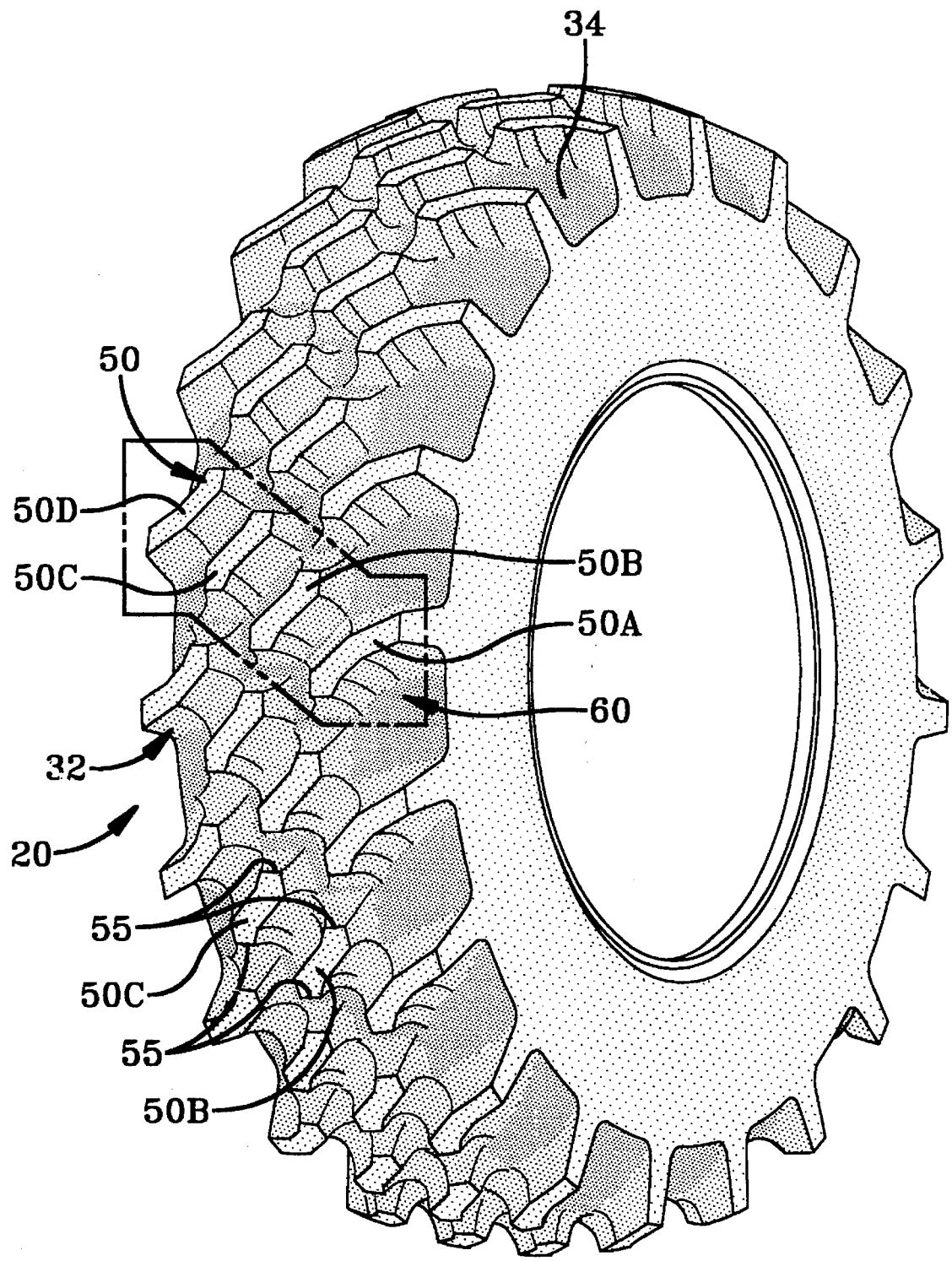
FIG. 1 is a perspective view of a preferred tire according to the present invention.
Figure 2:
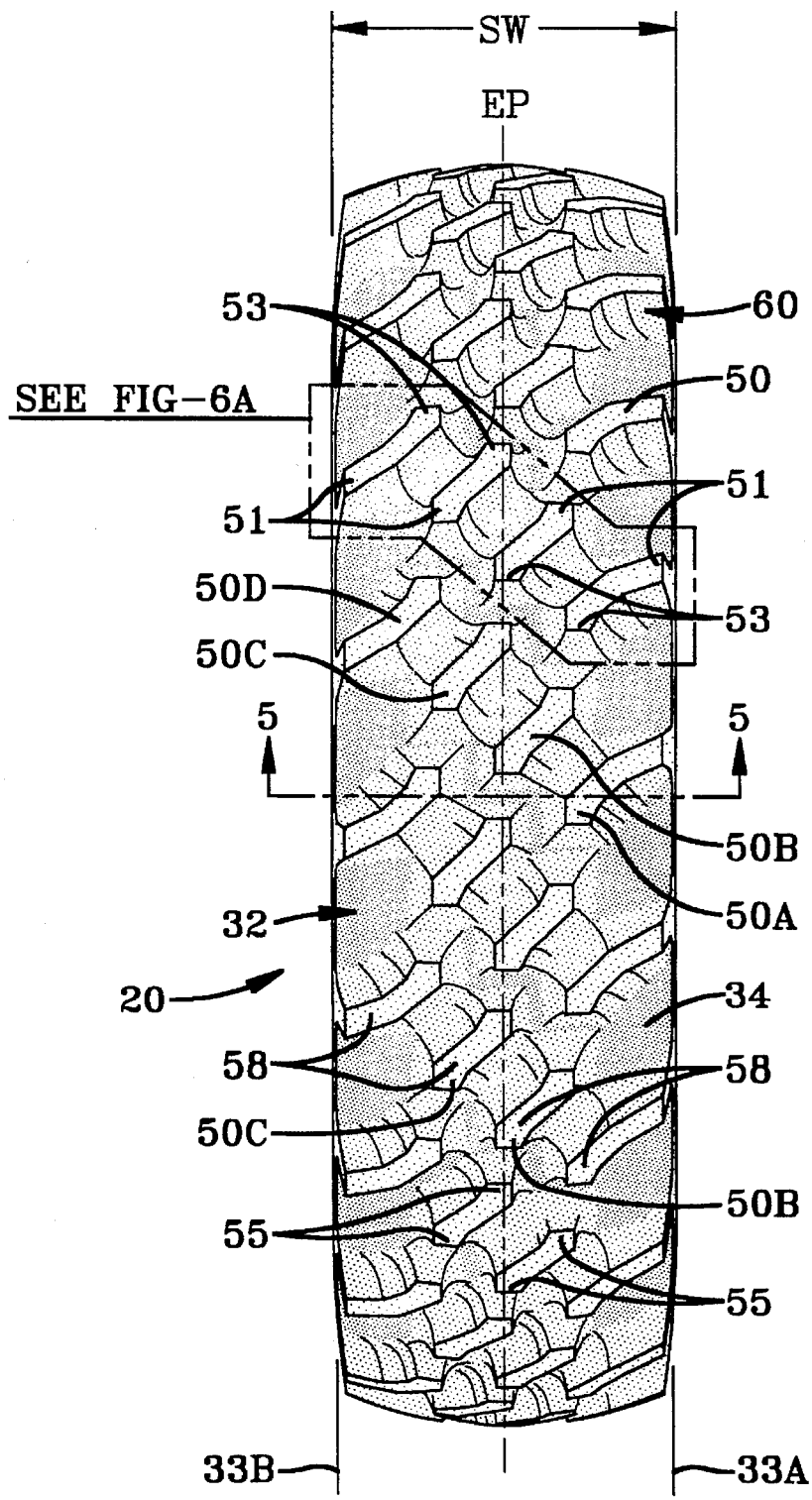
FIG. 2 is a plan view of the preferred tire according to the present invention.
Figure 3:
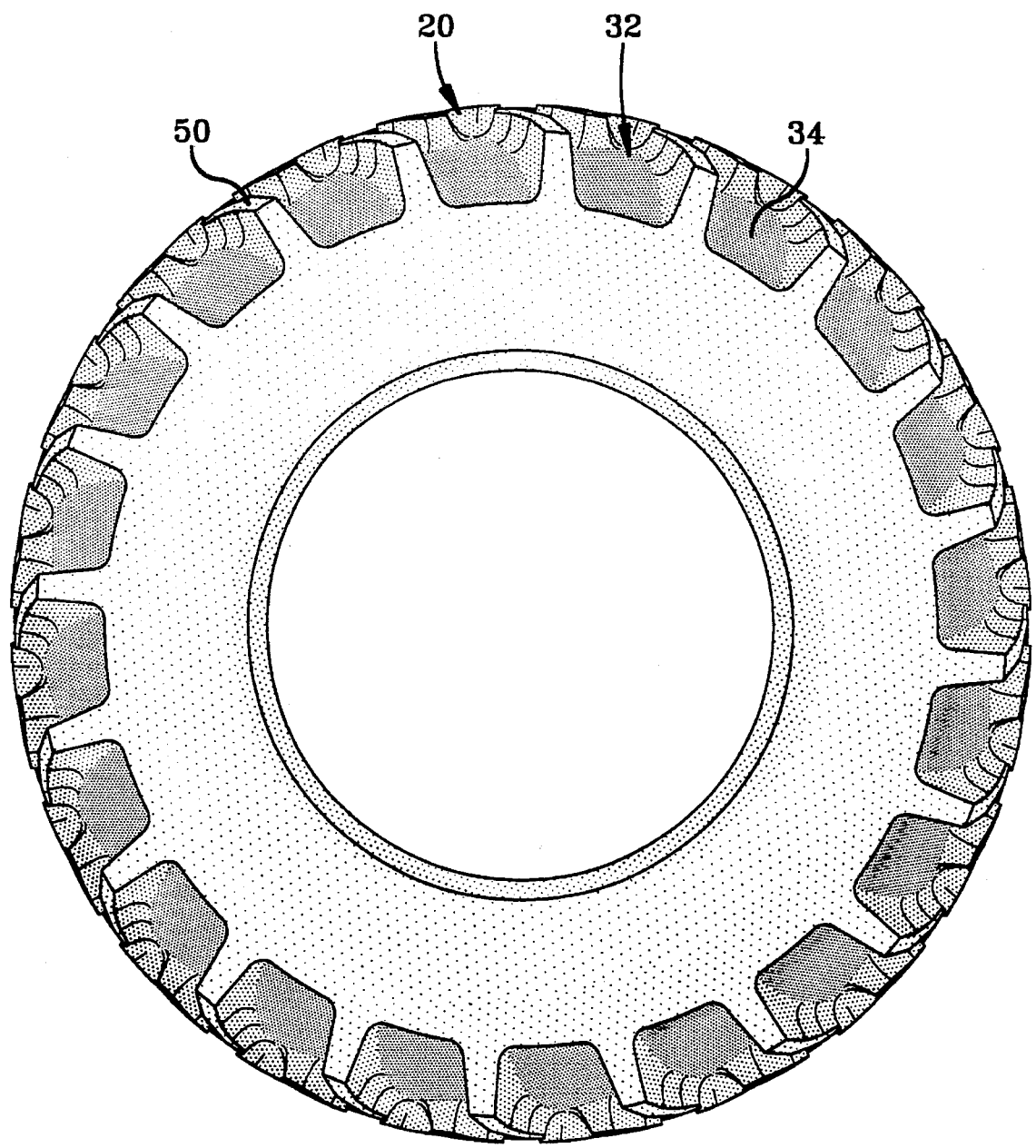
FIG. 3 is a side view of the preferred tire according to the present invention.
Figure 4:
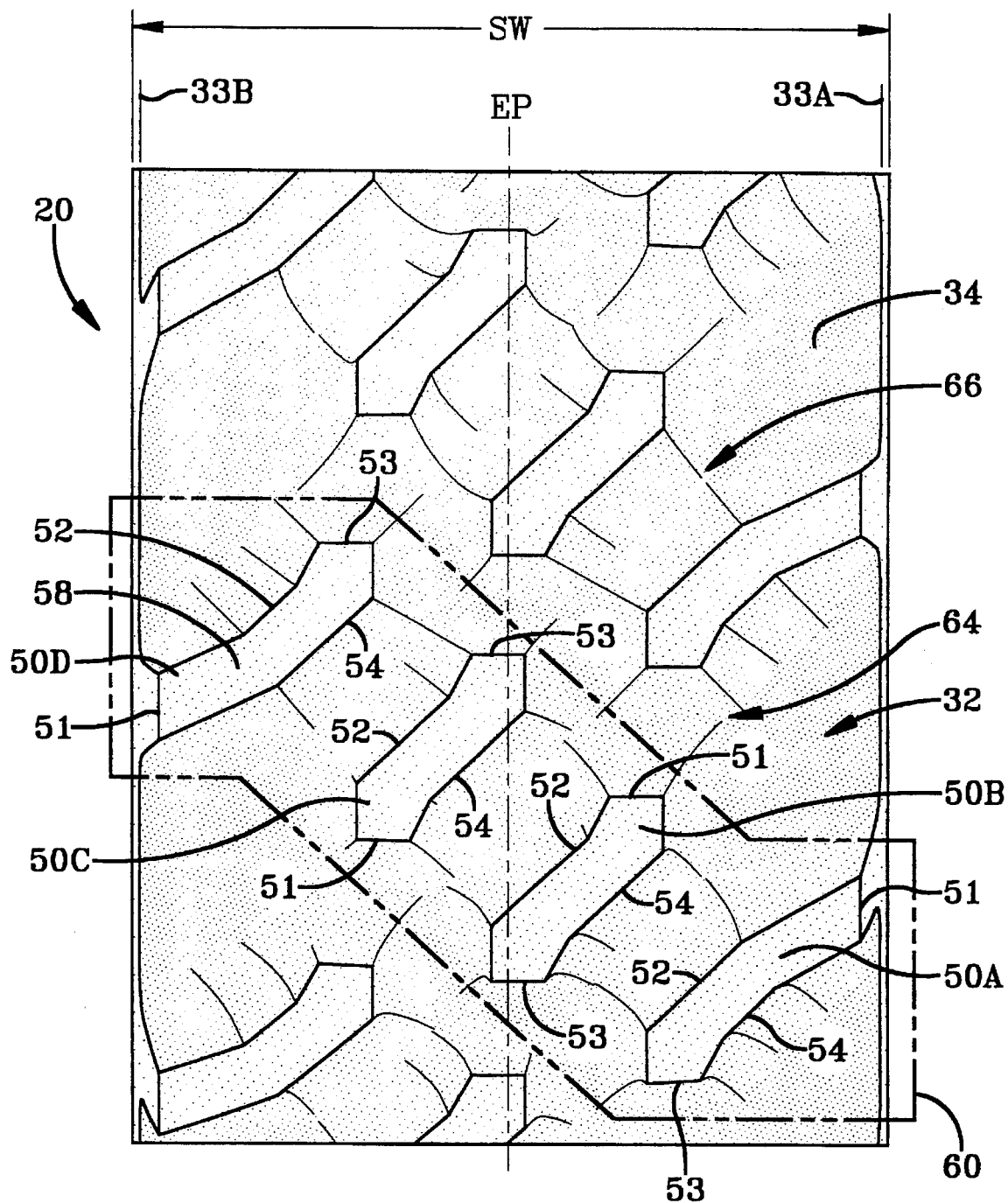
FIG. 4 is a fragmentary view of a tread portion of the preferred tire according to the present invention.

As illustrated in FIG. 4 each lug 50 has a radially outer surface 58, a first edge 52, second edge 54 and a centerline 63 between the first and second edges. Each lug 50 extends generally axially inwardly from an axially outer end 51 to an axially. inner end 53.

Figure 6A:
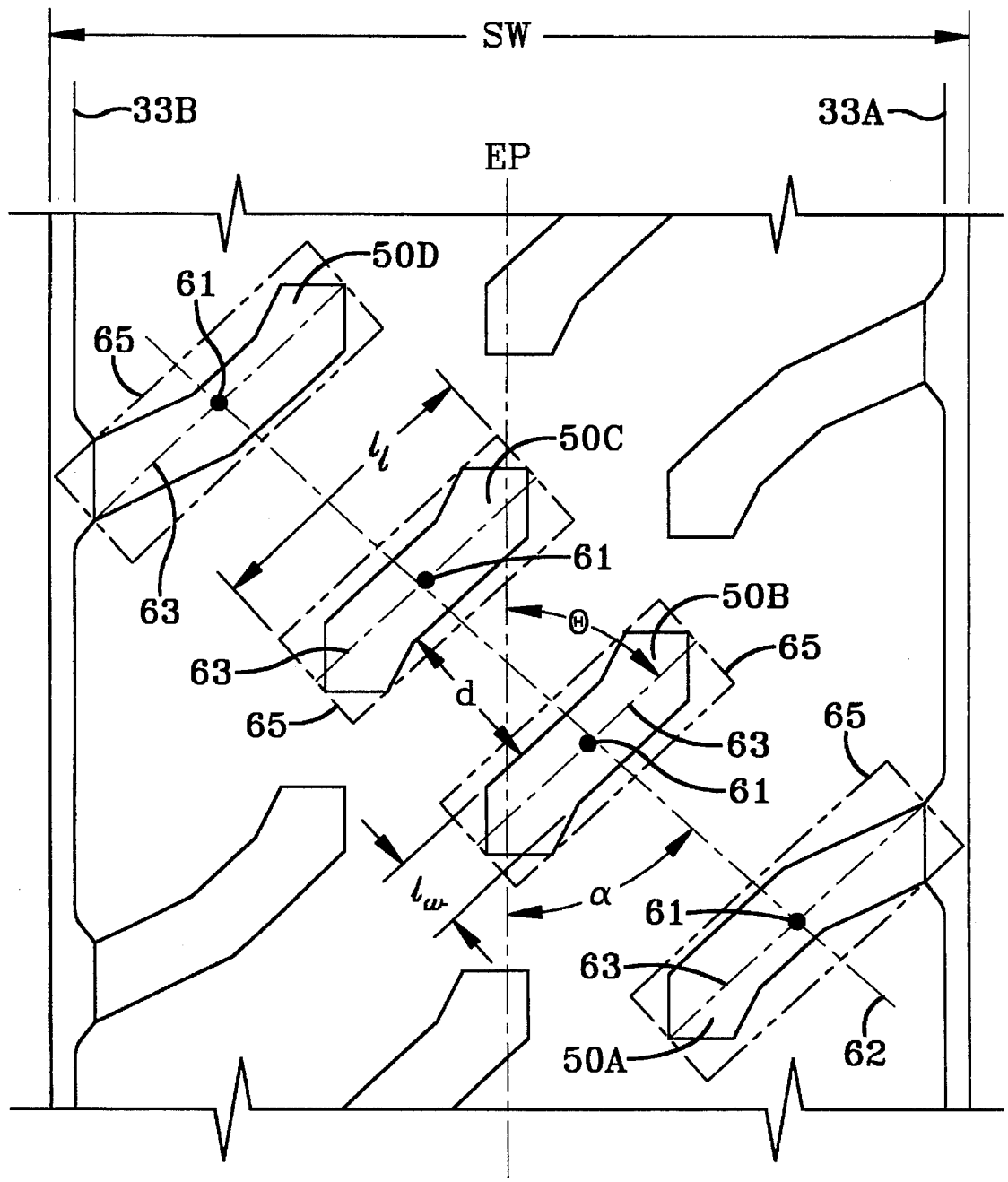
FIG. 6A is a plan view of a portion of the contact path of the preferred tire according to the present invention.
Figure 6B:
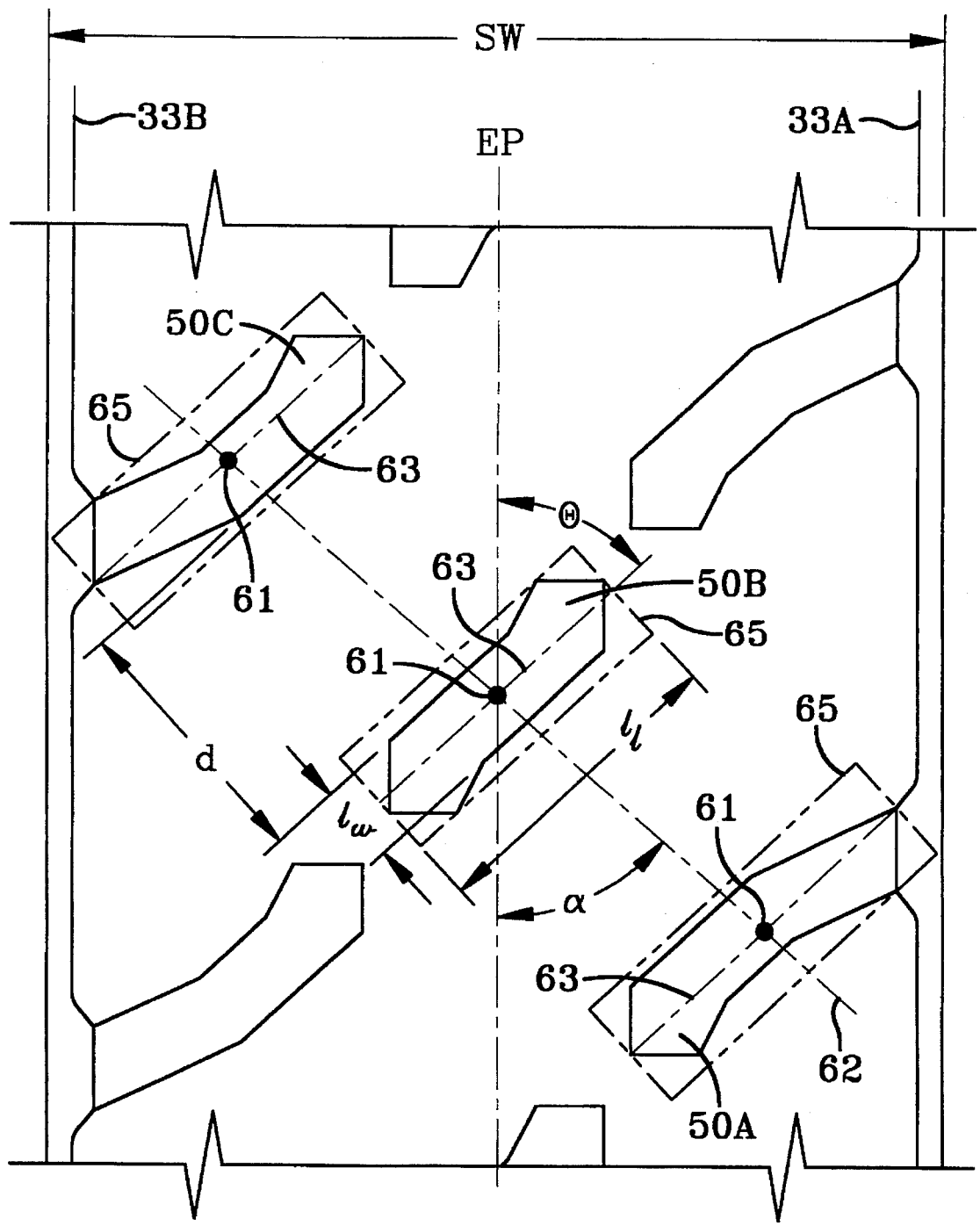
FIG. 6B is a similar view of a three lug set and FIG. 6C is a view of a 5 lug set.
Figure 6C:
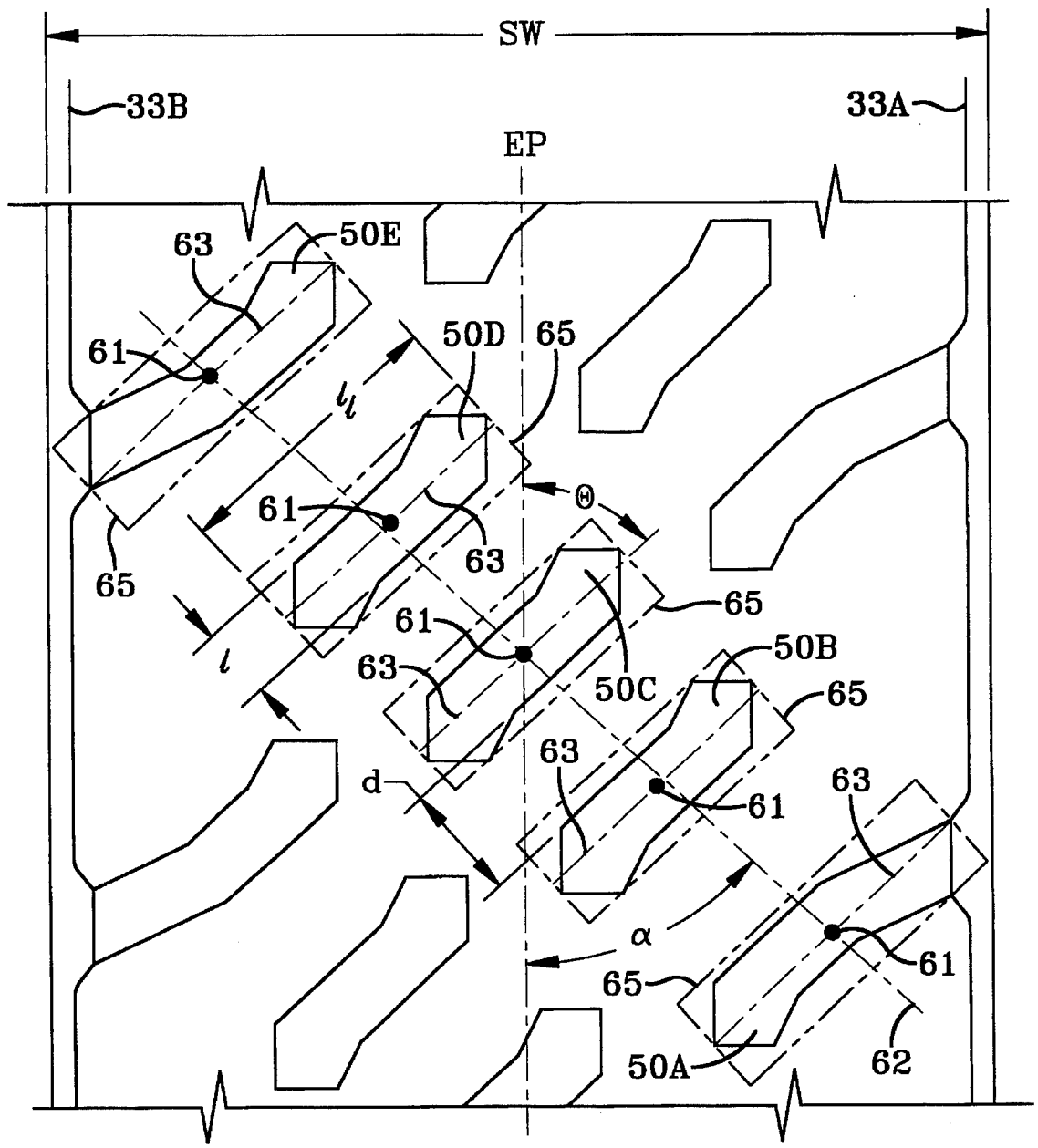

As illustrated in FIGS. 6A,6B and 6C the radially outer surface 58 when viewed from the contact patch has a polygonal shape. The surface 58 when encompassed by a rectangle 65 exhibits the approximate orientation of the lug 50. For purposes of this invention the centerline 63 of the lug 50 is approximated by a line intersecting midway through, thus bisecting, the short legs of rectangle, the line extending parallel to the long legs of the rectangle 65.

It is important to note that lugs have a length at least three times the width of the element whereas block elements have a width greater than one-third the length of the element. A lug for purposes of this invention has a length at least 10% of the section width of the tire.

The distance along the centerline 63 between the axially outer and inner ends 51,53 defines the length ($l_1$) of the lug 50.

The distance extending substantially perpendicularly between the first and second edges 52,54 of the lug define the lug width ($l_w$). The radial distance extending between the inner tread 34 and the edges 52,54 of the lug 50 defines the radial lug height ($l_h$). The ratio of the lug width ($l_w$) to lug radial height ($l_h$) is less than two-thirds over at least 70% of the lug length ($l_l$).

In the illustrated preferred embodiment of the invention as shown in FIGS. 1–4 the lugs 50 are arranged in a set 60 of at least three, preferably four substantially parallel lugs 50A,50B,50C and 50D. Within each set 60 as illustrated each lug 50A,50B,50C and 50D is oriented substantially parallel to one another, the lugs 50A and 50D being adjacent to a tread edge 33A,33B lug 50B and 50C being positioned between lugs 50A and 50D, lugs 50B and 50C being adjacent to and partially intersecting the equatorial plane. Lugs 50B and 50C are substantially equal in length while lug 50A and 50D as shown has a compound shape greater in length than lugs 50B and 50C. In the illustrated embodiment an end 51 or 53 of each lug 50A,50B,50C and 50D within a set 60 are aligned axially and circumferentially in almost a linear path 62. The approximately linear path 62 is inclined at an angle α relative to the equatorial plane, the angle α being about 45°. The angular alignment and position of lugs insures that open soil discharge channel 64 are maintained to prevent soil from packing the tread. Ideally each lug's outer surface 58 is spaced at least 5% of the section width (SW) from the outer surface 58 of an adjacent lug 50, preferably about 10%.

As further illustrated the sets 60 of lugs 50 are repeated circumferentially around the tread 32. The sets extend along the line 62 passing through the lug centers 61 in a substantially straight line across the tread from tread edge to tread edge, the line 62 being about perpendicular to the centerlines 63 of the lugs 50 within the set. As shown each lug centerline 63 is substantially parallel and forms an acute angle of θ with the equatorial plane of about 45°. It is believed preferable that each lug 50 of a set 60 have a centerline 63 inclined relative to the equatorial plane, each lug centerline 63 forming an average acute angle in the range of 35° to 55°.

The preferred tread pattern has four lugs 50A,50B,50C and 50D within a set as shown in FIGS. 1– 6A. AS shown in FIG. 6A, the line 62 passing approximately through the centers 61 is oriented at an angle relative to the equatorial plane, α being about 45°, in the preferred embodiment α is 48.5°. For the purposes of this invention, the line 62 is shown intersecting the centers of at least the lugs adjacent the tread edges 33A and 33B. Alternatively, the invention can employ three lugs 50A,50B,50C as shown in FIG. 6B or five lugs 50A, 50B,50C,50D,50E as shown in FIG. 6C. In FIGS. 6B and 6C the angle α is about 45° as illustrated in FIG. 6B, α equals 49° and in FIG. 6C, α equals 48°. In each figure the centerlines 63 of each lug is about perpendicular to the line 62. As can be seen, the centers 61 of each lug 50 is intersected by or is nearly intersected by the line 62.

Substantially parallel lugs 50 can extend from one tread edge or as illustrated both tread edges.

The tire 20 of the present invention being nondirectional is designed with the centrally deposed lug 50B or lugs 50B,50C having two ends, each end having an enlarged lug head 55.

Unlike the long channels created by tractor tires having long bars or lugs, the tread of the present invention has long channels 64 intersected by a plurality of cross-channels 66. These channels 64,66 give the soil a location to be displaced to as the tires turn, This feature greatly facilitates the maneuverability of the tractors through the soil.

The lugs 50 as shown are relatively short in length as compared to the section width of the tire. The lugs being less than 40% of the section width preferable less than 30% and more preferably less than 20%. The lugs as shown also had a preferred minimum length of at least 10% of the section width. These relatively short lugs 50 greatly improve the flexibility of the tread are believed to yield greatly reduced soil compaction compared to conventional longer lugs. As illustrated the lugs within a set 60 may vary in shape and length. Additionally, the circumferentially adjacent sets 60 may have lugs varied in length to effect a variable pitch pattern about the tread 32.

As shown in FIG. 6A, the lugs 50A,50B,50C and 50D are oriented such that the radially outermost surfaces 58 are spaced a distance "d" as measured from the edge of one lug to the nearest edge of an adjacent lug. The spaced distance "d" is about equal to at least 5% of the maximum section width, preferably 10%.

The tread's use of many short lugs actually increases the lug's tractive leading edge zones of shear as well as increasing the total radial outer surface area 58 of the lugs 50. This increased surface area has permitted two important benefits to be achieved. The tire according to the present invention can have a lighter weight than the prior art non-directional tires and the lugs can be made radially shorter while surpassing the traction in two directions when compared to the prior art tires.

Figure 7:
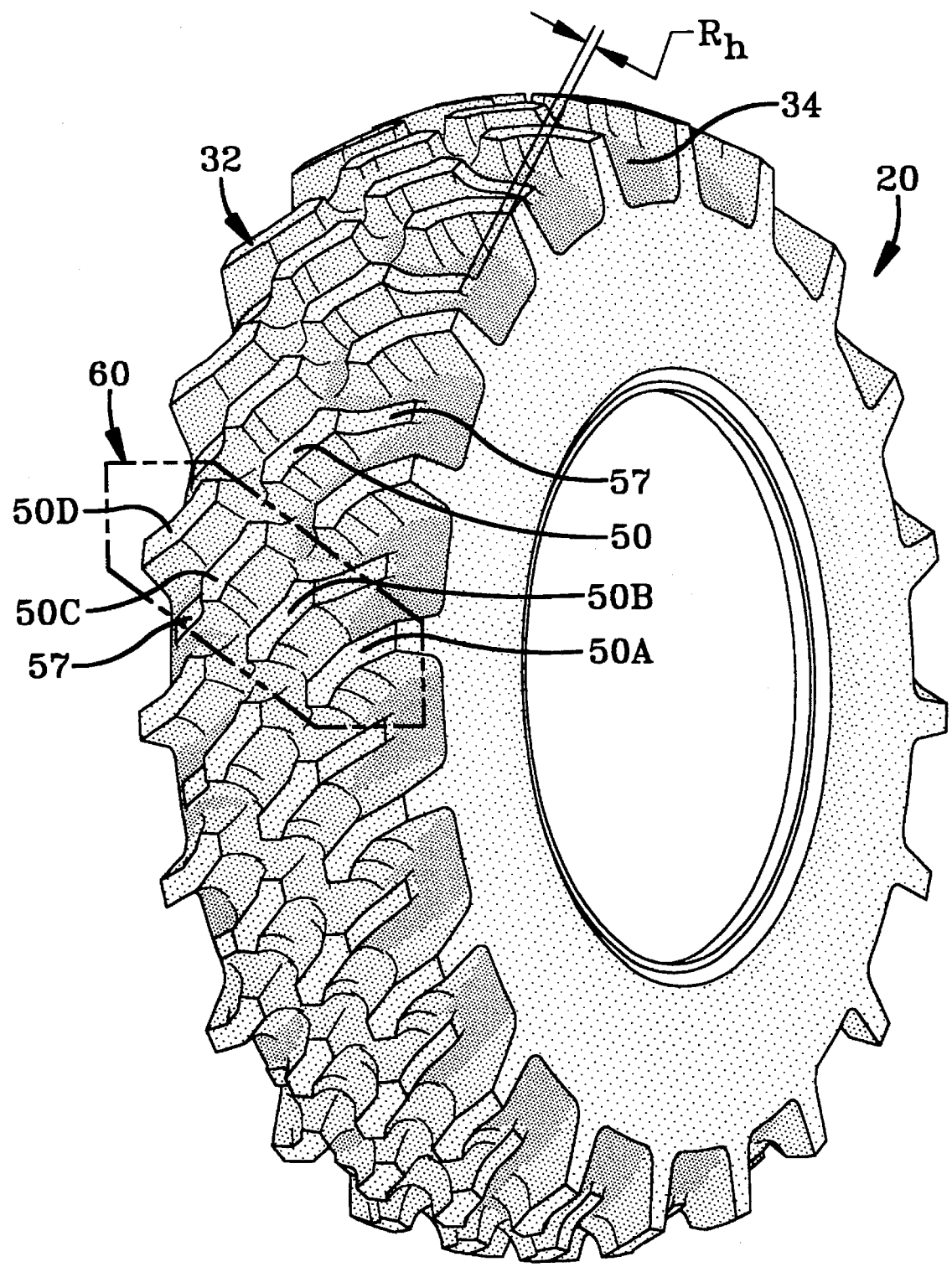
FIG. 7 is an alternative embodiment of the tire according to the present invention.

In the alternative embodiment tire of FIG. 7, projections 57 are shown extending from one end of each centrally deposed lug 50B,50C. The projections 57 have a radial height ($r_h$) of less than one half the radial lug height ($l_h$). As shown, a projection 57 extends between circumferentially adjacent lugs 50A or 50D extending from the same tread edge 30A or 33B. The projections 57, although considered optional, act as mud cleaning devices. The design as shown is believed to be sufficiently self-cleaning as to not require these added features.

Although not shown it is believed that the tires can be produced such that there is a left and right side tire, one tire being the mirror image of the other. This approach insures that under severe pulling or pushing loads with tire slippage the vehicle has offsetting lateral forces. This employment of tires eliminates the potential for sideways slippage of the vehicle. The tire design as presented will not require this feature, however, such a concept is considered within the scope of the invention as disclosed.

What is claimed is:

1. A non-directional pneumatic agricultural tire having a maximum section width (W), an axis of rotation, an equatorial plane perpendicular to the axis, a casing having a carcass reinforced with rubber coated cord, a robber tread disposed radially outwardly of the carcass, the tread including an inner tread and a plurality of tread lugs, the lugs respectively having a surface with a length ($l_L$) and a width ($l_w$) wherein the length ($l_L$) is at least three times the width ($l_w$) and the length ($l_L$) of the lugs being respectively at least 10% of the maximum section width, each lug having a centerline defined by a line bisecting a rectangle encompassing the lug surface, the tread having a first and a second tread edge and a net-to-gross ratio of less than 40%, the net-to-gross ratio being defined as the ratio of the surface area of the normally loaded and normally inflated tire tread rubber that makes contact with a hard, flat surface, divided by the area of the tread, including non-contacting portions such as grooves as measured around the entire circumference of the tire, the tread comprising a set including at least three lugs having substantially parallel lug centerlines, the set being repeated a plurality of times circumferentially about the tread, the set extending along a line approximately through the lug centers in a substantially straight line across the tread from the first tread edge to the second tread edge, the centerline of each lug being substantially parallel and forming an acute angle θ with the equatorial plane of about 45°.

2. The non-directional pneumatic agricultural tire of claim 1, wherein the sets have at least four substantially parallel lugs.

3. The non-directional pneumatic agricultural tire of claim 1 wherein the set has a substantially parallel lug extending from at least one tread edge.

4. The non-directional pneumatic agricultural tire of claim 1 wherein the set has a substantially parallel lug extending from each tread edge.

5. The non-directional pneumatic agricultural tire of claim 1, wherein the sets have at least one centrally deposed substantially parallel lug interposed between two axially outer substantially parallel lugs of the same set, the centrally deposed lug or lugs have two ends, each end having an enlarged lug head.

6. The non-directional pneumatic tire of claim 5, wherein the sets have lugs having a radial lug height ($l_h$), the centrally deposed lugs having a projection extending axially outwardly from at least one end, the projections having a radial height of less than one-half ($l_h$) extending between circumferentially adjacent lugs extending from the same tread edge.

7. The non-directional pneumatic agricultural tire of claim 1, wherein the surfaces of all lugs are spaced from an adjacent lug surface a distance of at least 10% of the maximum section width.

8. A non-directional pneumatic agricultural tire having a maximum section width (W), an axis of rotation, an equatorial plane perpendicular to the axis, a casing having a carcass reinforced with robber coated cord, a robber tread disposed radially outwardly of the carcass, the tread including an inner tread a plurality of tread lugs, the lugs respectively having a surface with a length ($l_L$) and a width ($l_W$) wherein the length ($l_L$) is at least three times the width ($l_W$) and the length ($l_L$) of the lugs being respectively at least 10% of the maximum section width, each lug having a centerline defined by a line bisecting a rectangle encompassing the lug surface, the tread having a first and a second tread edge and a net-to-gross ratio of less than 40%, the net-to-gross ratio being defined as the ratio of the surface area of the normally loaded and normally inflated tire tread robber that makes contact with a hard, flat surface, divided by the area of the tread, including non-contacting portions such as grooves as measured around the entire circumference of the tire, the tread comprising a set including at least three lugs having substantially parallel lug centerlines, the set being repeated a plurality of times circumferentially about the tread, the set extending along a line approximately through the lug centers in a substantially straight line across the tread from the first tread edge to the second tread edge, the centerline of each lug being substantially parallel and forming an acute angle θ with the equatorial plane in the range of 35° to 55°.

* * * * *